United States Patent
Kim

(10) Patent No.: US 10,619,683 B2
(45) Date of Patent: Apr. 14, 2020

(54) METHOD OF LEARNING TORQUE-STROKE RELATIONSHIP OF CLUTCH

(71) Applicant: HYUNDAI AUTRON CO., LTD., Seoul (KR)

(72) Inventor: Min-Hyo Kim, Gwangju-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 0 days.

(21) Appl. No.: 16/180,190

(22) Filed: Nov. 5, 2018

(65) Prior Publication Data

US 2019/0136920 A1 May 9, 2019

(30) Foreign Application Priority Data

Nov. 6, 2017 (KR) .......................... 10-2017-0146882

(51) Int. Cl.

| F16H 59/14 | (2006.01) |
|---|---|
| F16D 48/06 | (2006.01) |
| F16H 59/24 | (2006.01) |
| F16H 61/02 | (2006.01) |

(Continued)

(52) U.S. Cl.
CPC ......... *F16D 48/068* (2013.01); *F16H 59/141* (2013.01); *F16H 59/24* (2013.01); *F16H 61/0204* (2013.01); *F16H 61/688* (2013.01); *F16D 2500/106* (2013.01); *F16D 2500/10412* (2013.01); *F16D 2500/30406* (2013.01); *F16D 2500/30412* (2013.01); *F16D 2500/30806* (2013.01); *F16H 2061/0087* (2013.01)

(58) Field of Classification Search
None
See application file for complete search history.

(56) References Cited

U.S. PATENT DOCUMENTS

| 9,377,062 B2 | 6/2016 | Lee et al. |
| 2015/0167756 A1* | 6/2015 | Yoon ................... F16D 48/06 701/68 |

(Continued)

FOREIGN PATENT DOCUMENTS

| CN | 1526970 A | 9/2004 |
| CN | 106838056 A | 6/2017 |

(Continued)

OTHER PUBLICATIONS

Office Action, Chinese Patent Application No. 201811223027.1, Chinese Intellectual Property Office, dated Feb. 6, 2020, China.

*Primary Examiner* — Justin Holmes
(74) *Attorney, Agent, or Firm* — Baker & Hostetler LLP; Hyunho Park

(57) ABSTRACT

Provided are a method of learning a torque-stroke relationship of a clutch, and more particularly, a clutch torque-stroke learning method in which, during a process of dividing a torque region on a torque-stroke curve (T-S curve) of a clutch into two or more regions and learning the T-S curve passing through two or more torque regions with different torque section values, by learning the curve for a first torque region (e.g., a high-torque region or a low-torque region) when the curve is learned for a second torque region with guaranteed reliability, it is possible to prevent a problem of the T-S curve not converging to a previously learned curve value when the T-S curve is continuously learned for the two or more different torque regions.

6 Claims, 4 Drawing Sheets

(51) Int. Cl.
*F16H 61/688* (2006.01)
*F16H 61/00* (2006.01)

(56) References Cited

U.S. PATENT DOCUMENTS

| | | | |
|---|---|---|---|
| 2015/0167759 A1* | 6/2015 | Lee | F16D 48/06 |
| | | | 701/68 |
| 2016/0123411 A1* | 5/2016 | Cho | F16D 48/06 |
| | | | 477/176 |
| 2017/0166201 A1* | 6/2017 | Kim | B60K 6/48 |
| 2018/0172091 A1* | 6/2018 | Kim | F16D 48/06 |

FOREIGN PATENT DOCUMENTS

| | | |
|---|---|---|
| CN | 106838302 A | 6/2017 |
| KR | 101355620 B1 | 1/2014 |
| KR | 10-1576836 B1 | 12/2015 |
| KR | 10-2017-0001892 A | 1/2017 |
| KR | 10-1703758 B1 | 2/2017 |
| KR | 20170057896 A | 5/2017 |
| KR | 10-2017-0070714 A | 6/2017 |

* cited by examiner

METHOD OF LEARNING TORQUE-STROKE RELATIONSHIP OF CLUTCH

CROSS-REFERENCE TO RELATED APPLICATION

This application claims priority to and the benefit of Korean Patent Application No. 10-2017-0146882, filed on Nov. 6, 2017, the disclosure of which is incorporated herein by reference in its entirety.

BACKGROUND

1. Field

The present invention relates to a method of learning a torque-stroke relationship of a clutch, and more particularly, to a clutch torque-stroke learning method in which, during a process of dividing a torque region on a torque-stroke curve (T-S curve) of a clutch into two or more regions and learning the T-S curve passing through two or more torque regions with different torque section values, by learning the curve for any torque region (e.g., a high-torque region or a low-torque region) when the curve is learned for another torque region with guaranteed reliability, it is possible to prevent a problem of the T-S curve not converging to a previously learned curve value when the T-S curve is continuously learned for the two or more different torque regions.

2. Discussion of Related Art

Generally, a clutch, which is one part of a transmission for transferring power of an engine, is configured to transfer power by connecting a drive shaft engaged with a gear to the engine, or to block power by disconnecting the drive shaft from the engine.

An engine is connected to an input shaft by a clutch (i.e., a kind of shaft joint device that is used to connect or disconnect shafts to or from each other, that is configured to cut off or transfer power of the engine, and that is used upon a change in gear for a change in speed), and the input shaft is connected to an output shaft by a gear to transfer power to a wheel.

Actually, an input engine torque may be fully transferred to the clutch only when a relationship between a clutch torque and a stroke (i.e., a T-S curve) is accurately known during a clutch control operation for transferring power of the engine.

In order to transfer the torque of the engine to the clutch, the position of the clutch is changed by an actuator such as a solenoid or a motor. In this case, a graph showing a clutch transfer torque capacity according to the travel distance of the clutch is referred to as a T-S curve. The T-S curve may be used to predict the clutch transfer torque according to an accurate clutch travel distance by performing learning activities through abrasion, thermal deformation, and vehicle deviation.

A transmission may fully transfer an actually input engine torque to the clutch only when the relationship between the clutch torque and the stroke (the T-S curve) during the clutch control is accurately known. When a clutch torque greater than or equal to a normal value is matched to a specific stroke on the T-S curve, an excessive direct impact is generated. On the contrary, when a clutch torque less than the normal value is applied, the engine is run up.

In addition, even if the matching is accurately performed on the T-S curve at an initial stage, the T-S curve is different from an actual one depending on abrasion, thermal deformation, and mass production deviation. Thus, in order to prevent the occurrence of an abnormality (e.g., a slip or a shift shock) of a transmission system (or a clutch system), a torque region is divided into two or more regions such as a low-torque region and a high-torque region, and the interconnected curves need to converge with each other by learning the T-S curve for any region while learning the T-S curve for another region on the basis of reliable data in the other region.

The background of the present invention is disclosed in Korean Patent Publication No. 10-2017-0001892 (entitled "APPARATUS AND METHOD FOR LEARNING CLUTCH TORQUE OF DUAL CLUTCH TRANSMISSION" and published on Jan. 5, 2017).

For a conventional T-S curve learning method, when a T-S curve is learned starting from a high-torque region up to a low-torque region, a prestored value for the low-torque region is not utilized.

According to this method, when the T-S curve is learned starting from the high-torque region up to the low-torque region, the T-S curve that was previously learned in the low-torque region is twisted such that learning points are not matched to each other. Thus, there is a problem of the T-S curves connecting different torque regions not converging to each other. Also, the same problem is present even in the reverse case.

SUMMARY

Accordingly, the present invention has been devised to solve the aforementioned problems, and the present invention is directed to providing a clutch torque-stroke learning method in which, during a process of dividing a torque region into two or more regions such as a high-torque region or a low-torque region and learning the T-S curve for any one region, it is possible to prevent a slip or a shift shock by learning the T-S curve for another region on the basis of reliable data obtained from the other region such that the mutually connecting curves converge to each other.

According to an aspect of the present invention, there is provided a method of learning a torque-stroke relationship of a clutch, the method including a region division step in which a torque region is divided into a plurality of regions, a storage step in which a torque-stroke curve is learned and stored for each of the regions into which the torque region is divided in the region division step, a learning direction determination step in which a learning direction is determined according to a high or low variation of a torque, a reliability determination step in which reliability of the torque-stroke curve for a first region is determined while the torque-stroke curve is learned for a second region, and a learning point input step in which a learning point of the torque-stroke curve for the first region is input when the reliability is guaranteed in the reliability determination step.

In the region division step, the division of the torque region may be performed based on an engine torque, and the torque region may be divided into at least two or more regions according to whether a torque value is high or low.

In the storage step, when a torque error amount is less than a certain level in a certain torque region, a torque-stroke curve learned for the corresponding region may be stored.

Also, the reliability determination step may include a temperature change determination step for determining a difference between a temperature upon the current learning and a temperature upon learning and storing of a torque-stroke curve for a corresponding torque region and a learning time determination step for determining a temporal difference between a time of the current learning and a time of the learning of the torque-stroke curve for the torque region.

The method may further include an update step in which a new torque-stroke curve is learned instead of the learning point of the prestored torque-stroke curve for the other region being input when the reliability is not guaranteed in the reliability determination step.

When it is determined, in the temperature change determination step and the learning time determination step, the difference between the temperature upon the current learning and the temperature upon learning and storing of the torque-stroke curve for the corresponding torque region or the temporal difference between the time of the current learning and the time of the learning of the torque-stroke curve for the corresponding torque region is greater than or equal to a predetermined criterion, the reliability may be determined as being low.

In addition, the torque-stroke curve finally formed through the learning point input step or the update step may be determined and stored as the current T-S curve value.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
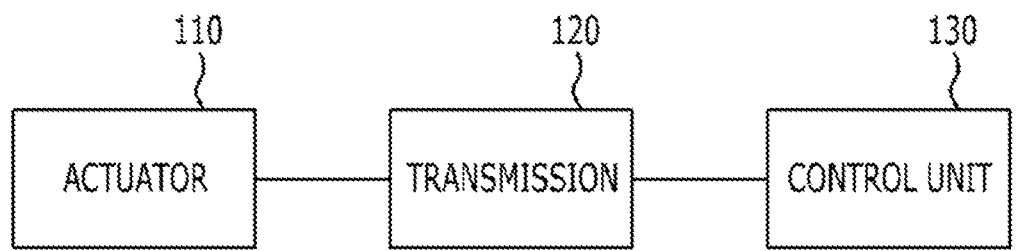
FIG. 1 is a schematic diagram of a general clutch transmission control device.

Example embodiments of the present invention will be described below in detail with reference to the accompanying drawings.

The terminology used herein is for the purpose of describing particular embodiments only and is not intended to be limiting the invention. As used herein, the singular forms "a," "an," and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or a combination thereof.

It should be understood that, although the terms first, second, etc. may be used herein to describe various elements, these elements are not be limited by these terms. These terms are used only to distinguish one element from another.

Moreover, terms such as "part," "unit," and "module" used herein refer to an element for performing at least one function or operation and may be implemented in hardware, software, or a combination thereof.

In the following description with reference to the accompanying drawings, the same reference numerals will be given to the same elements, and a duplicate description thereof will be omitted. Moreover, detailed descriptions related to well-known functions or configurations will be ruled out in order not to unnecessarily obscure subject matters of the present invention.

The present invention relates to a method of learning a torque-stroke relationship of a clutch, and more particularly, to a clutch torque-stroke learning method in which, during a process of dividing a torque region into two or more regions and learning a torque-stroke curve (T-S curve) passing through the two or more torque regions, by learning the T-S curve for any torque region (e.g., a high-torque region or a low-torque region) while learning the T-S curve for another reliable torque region, it is possible to prevent a problem of the T-S curve not converging to a previously learned curve value when the T-S curve is newly learned for different torque regions according to a conventional T-S curve learning method in which when the curve is learned starting from the high-torque region up to the low-torque region, a prestored value for the low-torque region is not utilized.

When the torque region is divided into two or more regions such as a low-torque region and a high-torque region and the T-S curve is learned for any region, the T-S curve is learned for another region on the basis of reliable data obtained for the other region such that the mutually connecting curves converge to each other. Thus, it is possible to accurately learn the T-S curve, thus preventing a slip or a shift shock.

Hereinafter, example embodiments of the present invention will be described with reference to the accompanying drawings.

FIG. 1 is a schematic diagram of a general clutch transmission control device.

Referring to FIG. 1, the clutch shift control device may include a clutch actuator 110 responsible for clutch interruption, a transmission 120 configured to control a shift fork of a transmission, and a control unit 130 configured to control the transmission 120 according to a vehicle speed and a throttle valve opening degree.

Here, the transmission 120 may include a dual-clutch transmission (DCT) including a drive shaft engaged with an engine output stage to transfer power generated by an engine and a non-drive shaft provided in parallel with the drive shaft and involved in shifting a gear.

Also, the transmission 120 should have an active interlock function in which a transmission lug of the same transmission system which is not involved in shifting is maintained in a neutral state so that the drive shaft or the non-drive shaft belonging to the same transmission system cannot be engaged at the same time. It will be appreciated that the transmission 120 should provide the above-described basic functions as a simple configuration and structure and should also secure stable and reliable operability as well as durability.

The control unit 130, which controls the transmission, serves to determine a difference between an actual position and a position on the T-S curve (i.e., a curve indicating a correlation between the clutch transferable torque and the clutch location) in the low torque and the high torque and to perform correction to increase or decrease the slope of the T-S curve.

Figure 2:
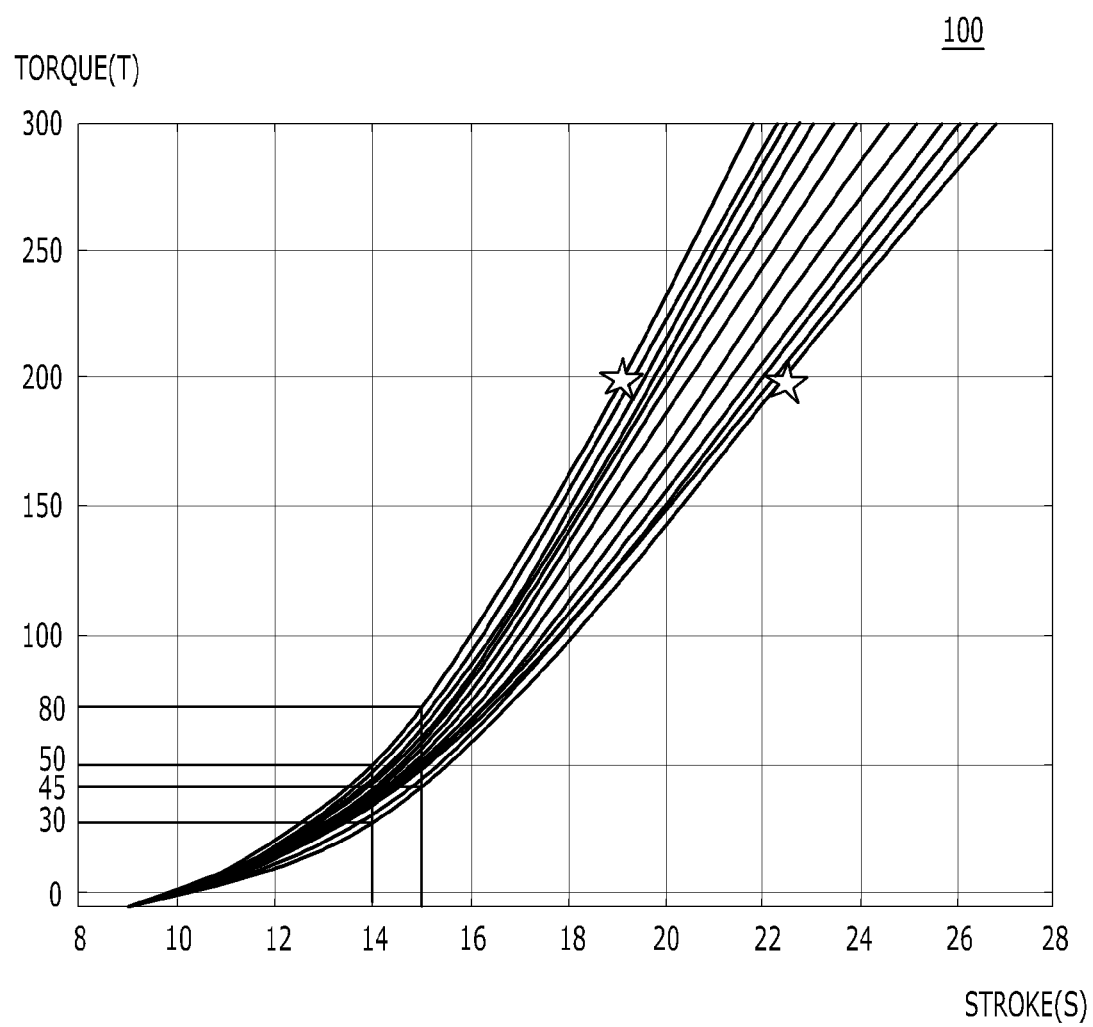
FIG. 2 shows a torque-stroke curve (T-S) curve learned according to a conventional technique.
Figure 3:
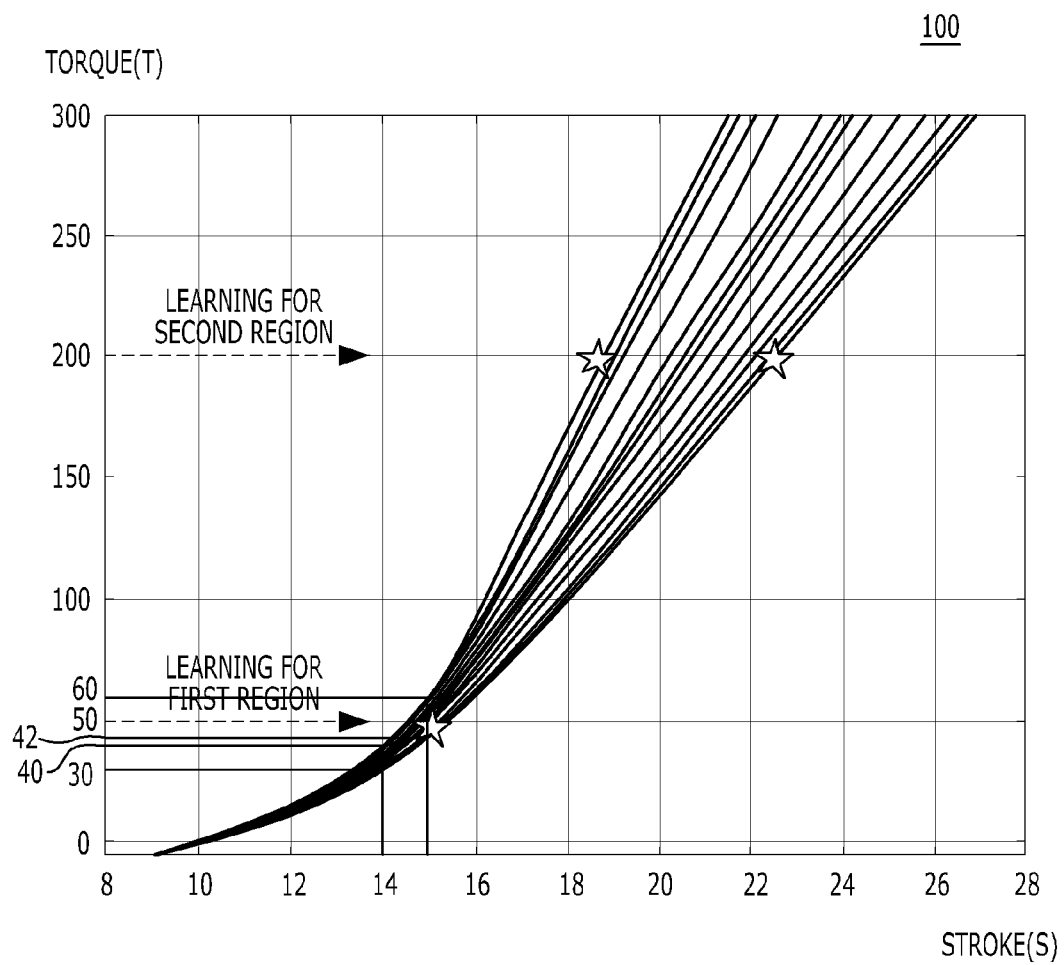
FIG. 3 shows a T-S curve learned according to an embodiment of the present invention.

FIG. 2 shows a T-S curve learned according to a conventional technique, and FIG. 3 shows a T-S curve learned according to an embodiment of the present invention.

Referring to FIG. 2, when the T-S curve is continuously learned between regions with different torque values according to a conventional technique, that is, when the learning is made starting from the high-torque region up to the low-torque region or made starting from the low-torque region up to the high-torque region, a result different from a previously learned and stored T-S curve value may be derived through a process of learning a section in which the slope becomes steep. When continuous curve values do not converge around the section in where the slope becomes steep, a curve for any one region is modified for correction, and thus the curve value may not be fixed but may have a large variation.

Compared to this, FIG. 3 may show that even when the T-S curve is continuously learned between regions with different torque values according to an embodiment of the present invention, the curve value of the graph converges stably and also show that around a section in which the slope significantly increases, the T-S curve is fixed and the variation is relatively and significantly reduced.

In detail, as shown in FIG. 2, a learning width of a torque value corresponding to a point having a clutch stroke value of 14 ranges from 30 to 50, and a learning width of a torque value corresponding to a point having a clutch stroke value of 15 ranges from 45 to 80. On the other hand, as shown in FIG. 3 in which the T-S curve in which the learning method according to the present invention is reflected, a learning width of a torque value corresponding to a point having a clutch stroke value of 14 ranges from 30 to 40, and a learning width of a torque value corresponding to a point having a clutch stroke value of 15 ranges from 42 to 60.

As a result, according to a method of learning the curve in a section in which a change in slope of the curve increases like the technical solution of the present invention and inputting a learning point with guaranteed reliability in the torque region, it is possible to increase the convergence degree of the curve and thus to increase the completion degree of the learned curve.

Figure 4:
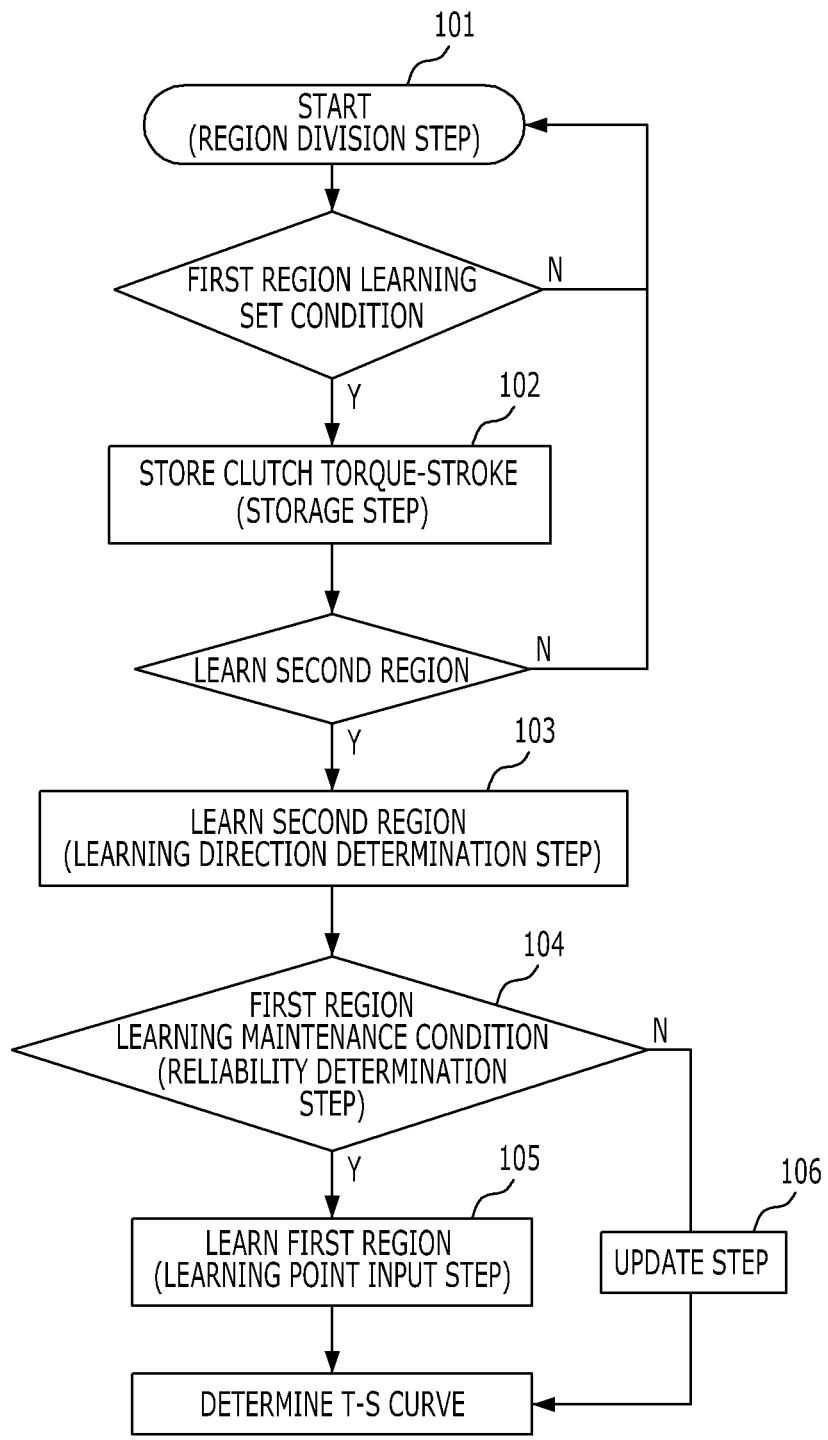
FIG. 4 is a flowchart illustrating a method of learning a T-S curve of a clutch according to an embodiment of the present invention.

FIG. 4 is a flowchart illustrating a method of learning a T-S curve of a clutch according to an embodiment of the present invention.

Referring to FIG. 4, it is possible to specifically describe each step of the method for carrying out the present invention having the above effects.

In detail, there is provided a clutch torque-stroke learning method including a region division step 101 in which a torque region is divided into a plurality of regions while a vehicle is traveling, a storage step 102 in which a torque-stroke curve is learned and stored for each of the regions into which the torque region is divided in the region division step 101, a learning direction determination step 103 in which a learning direction is determined according to a high or low variation of a torque, a reliability determination step 104 in which the reliability of the torque-stroke curve for the other region is determined while the torque-stroke curve is learned for a second region, and a learning point input step 105 in which a learning point of the torque-stroke curve for the other region is input when the reliability is guaranteed in the reliability determination step 104.

Generally, an engine and a transmission are provided in a vehicle. The engine and the transmission are coupled to each other to transfer a driving force to each wheel.

In this case, while the engine transfers power to a clutch (a friction clutch), only when a correlation between a change in position (i.e., stroke) of the clutch and a torque transferred to the clutch should be accurately found and stored, the correlation may be utilized in controlling shifting of the vehicle and in controlling traveling performance.

However, a curve representing the torque-stroke relation (hereinafter, a T-S curve) does not always have a fixed value once learned. A T-S curve value always changing in association with ambient conditions, such as a temperature, a usage period, and a usage status, of the clutch should be checked and corrected.

Accordingly, in order to perform additional learning to correct the T-S curve, when the torque region is divided into two or more regions such as a low-torque region and a high-torque region and the T-S curve is learned starting from any region up to another region, it is necessary to allow the mutually connected curves to converge by accurately and quickly inputting a learning point in a section in which the slope increases by using data which is reliable for the second region according to a predetermined condition.

In this case, in the region division step 101, the division of the torque region may be performed based on an engine torque, and the torque region may be divided into at least two or more regions according to whether the torque value is high or low.

As shown, the toque region may be divided into two regions, i.e., a first region and a second region, but the present invention is not limited thereto. The torque region may be divided into three or more regions.

Also, when a torque error amount decreases below a certain level in a certain torque region in the storage step 102, this situation may indicate that a region learning set condition is satisfied. Thus, the T-S curve may be stored for all the regions or for the first region.

In detail, when an error amount is insignificant due to a small variation of a torque value corresponding to a specific stroke through sufficient learning in a low-torque region, a corresponding stroke-torque value is specified and stored.

In this case, it is assumed that the T-S curve is stored for the first region or for all the regions. The curve is learned for another region, that is, the second region with a different torque value.

In this case, the torque value of the second region may be greater than that of the first region or may be less than that of the first region.

When the T-S curve is continuously learned between two or more regions having different torque values, a process of determining whether the learning is performed in a direction from a high-torque region to a low-torque region or in a direction from a low-torque region to a high-torque region, that is, the learning direction determination step 103, is required.

A process of determining whether to maintain the learning of the T-S curve for a region located in a traveling direction of the T-S curve (the first region in the drawing) in the torque region according to the learning direction determination step 103 is very important.

The determination of whether to maintain the learning of the T-S curve for the region located in the traveling direction of the T-S curve (the first region in the drawing) in the torque region may be performed in the reliability determination step 104 for determining whether the current reliability of a curve value stored for the corresponding region is maintained.

While the T-S curve of the clutch is being learned, a value always changing in association with ambient conditions, such as the current temperature, usage period, and usage state, of the clutch should be checked in order to determine need for correction. Thus, the reliability determination step 104 may include a temperature change determination step for determining a difference between a temperature upon the current learning and a temperature upon learning of the prestored torque-stroke curve for the torque region located in the traveling direction of the T-S curve and a learning time determination step for determining a temporal difference between a time of the current learning and a time of the learning of the prestored torque-stroke curve for the torque region located in the traveling direction of the T-S curve. In detail, the temperature of the clutch is not measured using a temperature sensor directly but calculated through a separate clutch temperature modeling logic using the temperature of engine oil or the like.

When the reliability is not guaranteed according to the reliability determination step 104, a learning point of a prestored torque-stroke curve for another region may not be input, and the update step 106 in which a new torque-stroke curve is learned may be performed.

However, when it is determined, in the temperature change determination step and the learning time determination step, that the difference between the temperature upon the current learning and the temperature upon learning of the prestored torque-stroke curve for the corresponding torque region or the temporal difference between the time of the current learning and the time of the learning of the prestored torque-stroke curve for the corresponding torque region does not exceed a predetermined criterion, it is determined to be reliable enough. In this case, a virtual learning point of the T-S curve with guaranteed reliability may be input to the torque region located in the traveling direction of the T-S curve in a section in which the slope of the curve increases.

On the other hand, when it is determined, in the temperature change determination step and the learning time determination step, the difference between the temperature upon the current learning and the temperature upon learning of the prestored torque-stroke curve for the corresponding torque region or the temporal difference between the time of the current learning and the time of the learning of the prestored torque-stroke curve for the corresponding torque region exceeds a predetermined criterion, the reliability is determined as being low. In this case, the learning point of the prestored torque-stroke curve for another region may not be input, and the update step 106 in which a new torque-stroke curve is learned may be performed.

Finally, by determining and storing the T-S curve finally formed through the learning point input step 105 or the update step 106 as the current T-S curve value, a T-S curve optimized for the current state of the vehicle may be obtained, and thus it is possible to prevent a slip or a shift shock.

When the torque region is divided into two or more regions such as a low-torque region and a high-torque region and the T-S curve is learned for any one region, the T-S curve is learned for another region on the basis of reliable data obtained for the other region such that the mutually connecting curves converge to each other. Thus, the T-S curve may be accurately learned, and thus it is possible to prevent a slip or a shift shock.

The above description is only illustrative of the technical idea of the present invention, and those skilled in the art will appreciate that various modifications, additions and substitutions are possible without departing from the essential characteristics of the invention.

Therefore, the embodiments disclosed herein are intended not to limit but to describe the technical spirit of the present invention, and the scope of the present invention is not limited to the embodiments. The scope of the invention should be construed by the appended claims, and all technical spirits within the scope of their equivalents should be construed as included in the scope of the invention.

What is claimed is:

1. A method of learning a torque-stroke relationship of a clutch, the method comprising:
   a region division step in which an engine torque region is divided into a plurality of regions by a control unit;
   a storage step in which a torque-stroke IT-S) curve is learned and stored, at a machine-readable storage medium, for each of the regions into which the torque region is divided in the region division step, wherein the T-S curve is a relationship curve between the engine torque and a stroke of an actuator, which moves the clutch;
   a learning direction determination step in which a learning direction is determined by the control unit according to a variation of the engine torque, wherein the variation of the engine torque includes a first direction when the engine torque decreases and a second direction when the engine torque increases;
   a reliability determination step in which a reliability of the T-S curve for a first region is determined by the control unit while the T-S curve is learned for a second region; and
   a learning point input step in which a learning point of the T-S curve for the first region is input by the control unit when the reliability of the T-S curve for the first region is an acceptable reliability in the reliability determination step,
   wherein the reliability determination step comprises:
   a temperature change determination step for determining a difference between a temperature upon the current learning and a temperature upon learning of a prestored T-S curve for a corresponding torque region; and
   a learning time determination step for determining a temporal difference between a time of the current learning and a time of the learning of the prestored T-S curve for the torque region,
   wherein when it is determined, in the temperature change determination step, the difference between the temperature upon the current learning and the temperature upon learning of the prestored T-S curve for the corresponding torque region is greater than or equal to a predetermined criterion, the reliability is determined as an unacceptable reliability,
   the difference between the temperature upon the current learning and the temperature upon learning of the prestored T-S curve for the corresponding torque region is lower than a predetermined criterion, the reliability is determined as the acceptable reliability,
   wherein when it is determined, in the learning time determination step, the temporal difference between the time of the current learning and the time of the learning of the prestored T-S curve for the corresponding torque region is greater than or equal to a predetermined criterion, the reliability is determined as the unacceptable reliability,
   the temporal difference between the time of the current learning and the time of the learning of the prestored T-S curve for the corresponding torque region is lower than a predetermined criterion, the reliability is determined as the acceptable reliability.

2. The method of claim 1, wherein in the region division step, the division of the engine torque region is determined based on the engine torque controlled by the actuator at the control unit.

3. The method of claim 1, wherein in the region division step, the division of the engine torque region is performed based on an engine torque value, and the torque region is divided into at least two or more regions according to an extent of the engine torque value.

4. The method of claim 1, wherein in the storage step, when a torque error amount is less than a certain level in a certain torque region, a torque-stroke curve learned for the corresponding region is stored.

5. The method of claim 1, further comprising an update step in which a new T-S curve is learned instead of the learning point of the prestored T-S curve for the first region being input when the reliability is the unacceptable reliability in the reliability determination step.

6. The method of claim 5, wherein the T-S curve finally formed through the learning point input step or the update step is determined and stored as the current T-S curve value.

* * * * *